US012735532B1

(12) United States Patent
Zhao et al.

(10) Patent No.: US 12,735,532 B1
(45) Date of Patent: Sep. 15, 2026

(54) FLEXIBLE HYDROPHILIC ASPARTIC RESIN AND EMULSION

(71) Applicant: SHENZHEN FEIYANG PROTECH CORP., LTD, Shenzhen (CN)

(72) Inventors: Poli Zhao, Shenzhen (CN); Jiang Wu, Shenzhen (CN); Xiaoyong Qiu, Shenzhen (CN); Linna Che, Shenzhen (CN); Shankai Luo, Shenzhen (CN); Longhui Zhu, Shenzhen (CN)

(73) Assignee: SHENZHEN FEIYANG PROTECH CORP., LTD, Shenzhen (CN)

( * ) Notice: Subject to any disclaimer, the term of this patent is extended or adjusted under 35 U.S.C. 154(b) by 0 days.

(21) Appl. No.: 19/381,115

(22) Filed: Nov. 6, 2025

Related U.S. Application Data

(63) Continuation of application No. PCT/CN2025/122985, filed on Sep. 22, 2025.

(30) Foreign Application Priority Data

Jul. 22, 2025 (CN) ........................ 202511009512.9

(51) Int. Cl.
*C08G 69/10* (2006.01)

(52) U.S. Cl.
CPC .................................. *C08G 69/10* (2013.01)

(58) Field of Classification Search
None
See application file for complete search history.

(56) References Cited

U.S. PATENT DOCUMENTS

| | | | | |
|---|---|---|---|---|
| 12,503,610 | B2 * | 12/2025 | Chen | C09D 5/1675 |
| 2021/0277277 | A1 * | 9/2021 | Greszta-Franz | C08G 18/3256 |
| 2022/0119674 | A1 * | 4/2022 | Wang | C08G 18/4277 |
| 2024/0209232 | A1 * | 6/2024 | Sienkowska | C09D 175/04 |
| 2024/0336805 | A1 * | 10/2024 | Durgut | C08G 18/73 |
| 2025/0026952 | A1 * | 1/2025 | Hui | C08G 18/3234 |
| 2025/0206981 | A1 * | 6/2025 | Turner | C08G 18/3821 |
| 2025/0230337 | A1 * | 7/2025 | Suetterlin | C08G 18/73 |
| 2025/0257167 | A1 * | 8/2025 | Johnston | C09D 5/00 |

* cited by examiner

*Primary Examiner* — Megan McCulley
(74) *Attorney, Agent, or Firm* — Cooper Legal Group, LLC

(57) ABSTRACT

Disclosed are a flexible hydrophilic aspartic resin and an emulsion, which relate to the technical field of aspartate resins. The present application introduces hydrophilic segments and flexible segments into the structure of aspartic resin, thereby obtaining aspartic resin possessing both flexibility and hydrophilicity. The flexible hydrophilic aspartic resin can be self-emulsified and dispersed in water to form an emulsion.

8 Claims, No Drawings

FLEXIBLE HYDROPHILIC ASPARTIC RESIN AND EMULSION

CROSS-REFERENCE TO RELATED APPLICATION

The present application is a continuation of PCT application serial no. PCT/CN2025/122985, filed on Sep. 22, 2025, which claims the priority benefits of China patent application No. 202511009512.9, filed on Jul. 22, 2025. The entireties of PCT application serial no. PCT/CN2025/122985 and China patent application No. 202511009512.9 are hereby incorporated by reference herein and made a part of this specification.

TECHNICAL FIELD

The present application belongs to the technical field of aspartate resins, and relates to a flexible hydrophilic aspartic resin and an emulsion.

BACKGROUND ART

Aspartic polyurea coatings formed by curing polyaspartate resin with isocyanate exhibit excellent weather resistance, good chemical corrosion resistance, high mechanical strength, good adhesion, and fast curing speed. With the development of aqueous coatings, the development of aqueous aspartic polyurea coatings is imperative. The aqueous aspartic polyurea coatings generally consist of hydrophilic polyaspartate resin and aqueous isocyanate curing agent. Based on performance requirements for aqueous aspartic polyurea coatings, there are certain demands placed on the hydrophilic polyaspartate resin. If the hydrophilicity of the hydrophilic polyaspartate resin is too high, it may lead to insufficient water resistance and adhesion of the coating; if the hydrophilicity is inadequate, additional emulsifiers must be introduced, which can also negatively affect coating performance. Therefore, higher requirements are imposed on hydrophilic polyaspartate resins. For example, in conventional techniques, hydrophilic polyaspartate resins are mainly prepared by grafting hydrophilic polyethylene glycol segments onto side chains of polyaspartate resins via transesterification reactions, or by conducting Michael addition reactions between maleate esters containing polyethylene glycol segments and binary primary amine compounds. However, the hydrophilic polyaspartate resins obtained by such methods tend to have excessively high hydrophilicity.

In addition, for aqueous aspartic polyurea coatings, flexibility of the cured film layer should be considered, but existing aqueous aspartic polyurea film layers lack sufficient flexibility.

SUMMARY

To solve the above-mentioned technical problems, the present application provides a flexible hydrophilic aspartic resin and an emulsion.

The technical solution of the present application is as follows:

A flexible hydrophilic aspartic resin including a —N(X)CONH— group, a first polyether segment, a second polyether segment, and at least one of structures of the following formula (1) and formula (2):

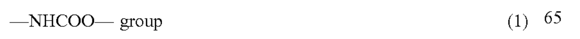

—NHCOO— group (1)

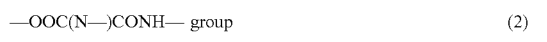

—OOC(N—)CONH— group (2)

wherein X is selected from H or a residue remaining after removing one hydrogen atom from an amino group of an amino resin containing the amino group, the amino group being a secondary amino group;

a molar content of a polyethylene glycol segment in the first polyether segment is not less than 80%, wherein the first polyether segment is directly chemically bonded to at least one of the —NHCOO— group or the —OOC(N—)CONH— group;

a molar content of a polyethylene glycol segment in the second polyether segment is not higher than 20%, wherein the second polyether segment is directly chemically bonded to at least one of the —NHCOO— group or the —OOC(N—)CONH— group;

or, the hydrophilic aspartic resin includes the —N(X)CONH— group, a cation-containing structure, and at least one of the structures as shown in the formula (1) and formula (2).

Preferably, a structure of the first polyether segment is as shown in formula (3):

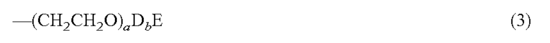

$—(CH_2CH_2O)_aD_bE$ (3)

wherein D is at least one selected from a group consisting of: $—CH_2CH_2CH_2O—$, $—CH_2CH_3CHO—$, $—(CH_2)_4O—$, $—CH_2CH_2CH_3CHO—$, and $—(CH_2)_6O—$, $4 \le a \le 50$, $b \ge 0$, $a/(a+b) \ge 0.8$, and E is selected from $C_1$-$C_4$ alkyl group.

Preferably, a structure of the second polyether segment is as shown in formula (4):

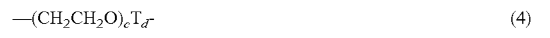

$—(CH_2CH_2O)_cT_d—$ (4)

wherein T is at least one selected from a group consisting of: $—CH_2CH_3CHO—$, $—(CH_2)_4O—$, $—CH_2CH_2CH_3CHO—$, $—(CH_2)_6O—$, and a divalent residue remaining after removing two active hydrogens from a polyester diol; $c \ge 0$; $4 \le d \le 50$; $c/(c+d) \le 0.2$.

More preferably, a weight ratio of the first polyether segment in the hydrophilic aspartic resin is 3-35%; and a weight ratio of the cation-containing structure in the hydrophilic aspartic resin is 2-15%.

Preferably, both ends of the second polyether segment are directly chemically bonded to the —NHCOO— group or the —OOC(N—)CONH— group.

Preferably, a weight ratio of the second polyether segment in the hydrophilic aspartic resin is 5-45%.

Preferably, the hydrophilic aspartic resin is obtained by reacting a raw material component A): a hydrophilic isocyanate prepolymer with a raw material component B): a second polyether diol, and then reacting with a raw material component C): a first amino resin;

the hydrophilic isocyanate prepolymer contains the first polyether segment;

the second polyether diol contains the second polyether segment;

or, the hydrophilic aspartate resin is obtained by reacting a raw material component D): a tertiary amine-containing isocyanate prepolymer with a raw material component E): a second amino resin followed by neutralization;

structures of the first amino resin and the second amino resin are independently as shown in formula (5):

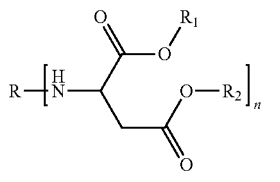

(5)

wherein R is an n-valent organic group with a number-average molecular weight of 50-5000 that is reaction-inert to isocyanate at 100° C., $R_1$ and $R_2$ are independently selected from $C_1$-$C_8$ alkyl groups, and n is 2, 3, or 4.

Preferably, a weight ratio of NCO groups in the hydrophilic isocyanate prepolymer and the tertiary amine-containing isocyanate prepolymer is independently 5-40%.

Preferably, a molar ratio of the second polyether diol to the first amino resin is 1:10-1:1;

a sum of mole numbers of active hydrogen in the second polyether diol and active hydrogen in the first amino resin to a mole number of NCO groups in the hydrophilic isocyanate prepolymer is in a ratio of 0.7-3:1; and a molar ratio of NCO groups in the tertiary amine-containing isocyanate prepolymer to NH groups in the second amino resin is 1:1-5.

An emulsion obtained by dispersing a raw material component including the flexible hydrophilic aspartic resin according to any one of the above technical solutions in water.

Advantageous effects of the present application are:

(1) The present application introduces highly hydrophilic polyether segments into the isocyanate prepolymer and uses a flexible polymer diol as one of the raw material components to react with the isocyanate prepolymer, thereby obtaining the aspartic resin with moderate hydrophilicity that can self-emulsify and disperse in water. The film formed after curing the emulsion obtained by dispersing the aspartic resin in water exhibits good flexibility, high elongation at break, minimal impact on mechanical strength, and favorable water resistance and other properties.

(2) Alternatively, the hydrophilic aspartate resin of the present application can further introduce cation-containing structures to provide both good hydrophilicity and good flexibility, enabling self-emulsification and dispersion in water. The film formed after curing the emulsion obtained by dispersing the aspartic resin in water exhibits good flexibility and high elongation at break.

DETAILED DESCRIPTION

The following further describes and illustrates the technical solutions of the present application through specific examples.

To improve the flexibility of hydrophilic aspartic resin film, on one hand, the present application provides a flexible hydrophilic aspartic resin including a —N(X)CONH— group, a first polyether segment, a second polyether segment, and at least one of structures of the following formula (1) and formula (2):

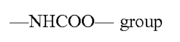

—NHCOO— group (1)

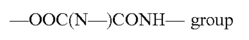

—OOC(N—)CONH— group (2)

wherein X is selected from H or a residue remaining after removing one hydrogen atom from an amino group of an amino resin containing the amino group, the amino group being a secondary amino group;

a molar content of a polyethylene glycol segment in the first polyether segment is not less than 80%, wherein the first polyether segment is directly chemically bonded to at least one of the —NHCOO— group or the —OOC(N—)CONH— group;

a molar content of a polyethylene glycol segment in the second polyether segment is not higher than 20%, wherein the second polyether segment is directly chemically bonded to at least one of the —NHCOO— group or the —OOC(N—)CONH— group;

or, the hydrophilic aspartic resin includes a —N(X)CONH— group, a cation-containing structure, and at least one of the structures as shown in the formula (1) and formula (2).

To obtain the flexible hydrophilic aspartate resin, the present application may introduce the first polyether segment and the second polyether segment into the aspartic resin. The first polyether segment has good hydrophilicity and imparts favorable hydrophilic properties to the aspartic resin, while the second polyether segment has good flexibility and imparts good flexibility to the aspartic resin, thus obtaining the flexible hydrophilic aspartic resin.

In the present application, the hydrophilicity and flexibility of the hydrophilic aspartate resin may also originate from cation-containing structures, such as cationic tertiary amine structures, quaternary ammonium salt structures, etc., allowing the attainment of the flexible hydrophilic aspartate resin without introducing additional flexible segments.

For the —N(X)CONH— group, for example, it can be obtained by the reaction between NCO groups and NH groups, such as the reaction of polyisocyanate monomers or isocyanate prepolymers with polyaspartic acid ester resins (such as F420 resin, F520 resin from Feiyang Junyan Company), wherein X corresponds to a residue remaining after removing two hydrogen atoms from a secondary amino group of the polyaspartic acid ester resin. Of course, the —N(X)CONH— group may also be obtained by the reaction between NCO groups and $NH_2$ groups, such as with polymers containing primary amino groups.

For direct chemical bonding between the first polyether segment and the —NHCOO— group shown in formula (1), it can be achieved by reacting a first terminal hydroxyl polyether corresponding to the first polyether segment with NCO groups (such as polyisocyanate monomers or isocyanate prepolymers). After the first terminal hydroxyl polyether corresponding to the first polyether segment reacts with the NCO group to form the —NHCOO— group, the —NHCOO— group can further react with the NCO group to yield the —OOC(N—)CONH— group shown in formula (2).

For direct chemical bonding between the second polyether segment and the —NHCOO— group shown in formula (1), it can be achieved by reacting a second terminal hydroxyl polyether corresponding to the second polyether segment with NCO groups (such as polyisocyanate monomers or isocyanate prepolymers). After the second terminal hydroxyl polyether corresponding to the second polyether segment reacts with the NCO group to form the —NHCOO— group, the —NHCOO— group can further react with the NCO group to yield the —OOC(N—)CONH— group shown in formula (2).

In some embodiments, a structure of the first polyether segment is as shown in formula (3):

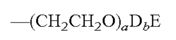

$—(CH_2CH_2O)_aD_bE$ (3), wherein D is at least one selected from a group consisting of: $—CH_2CH_2CH_2O—$, $—CH_2CH_3CHO—$, $—(CH_2)_4O—$, $—CH_2CH_2CH_3CHO—$, and $—(CH_2)_6O—$, a represents an average degree of polymerization of $—CH_2CH_2O—$, b represents an average degree of polymerization of D structure, $4 \leq a \leq 50$, $b \geq 0$, $a/(a+b) \geq 0.8$, and E is selected from $C_1$-$C_4$ alkyl group.

In the present application, a main function of the first polyether segment is to impart good hydrophilic properties to the aspartic resin. Therefore, the first polyether segment contains a relatively high proportion of hydrophilic polyethylene glycol segments. The first polyether segment may be either pure polyethylene glycol segments or copolymers of polyethylene glycol segments and other polyether segments (such as polypropylene glycol segments). The first terminal hydroxyl polyether (a mono-terminal hydroxyl polyether) corresponding to the first polyether segment can be commercially available, such as methoxypolyethylene glycols (MPEG) with number-average molecular weights of 200-2000, for example MPEG-200 (200 indicates number-average molecular weight), MPEG-400, MPEG-600, MPEG-800, MPEG-1000, MPEG-1500, MPEG-2000, etc.

In some embodiments, a structure of the second polyether segment is as shown in formula (4):

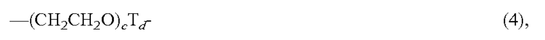

$$—(CH_2CH_2O)_cT_d— \quad (4),$$

wherein T is at least one selected from a group consisting of: $—CH_2CH_2CH_2O—$, $—CH_2CH_3CHO—$, $—(CH_2)_4O—$, $—CH_2CH_2CH_3CHO—$, $—(CH_2)_6O—$, and a divalent residue remaining after removing two active hydrogens from a polyester diol; c represents an average degree of polymerization of $—CH_2CH_2O—$, d represents an average degree of polymerization of T structure, $c \geq 0$, $4 \leq d \leq 50$, $c/(c+d) \leq 0.2$.

In the present application, a main function of the second polyether segment is to impart good flexibility to the aspartic resin. Therefore, the second polyether segment has good flexibility, and the corresponding second terminal hydroxyl polyether (a difunctional hydroxyl polyether) may be polypropylene glycol (PPO), polyethylene oxide-polypropylene oxide (PEO-PPO), polytetramethylene ether glycol (PTMEG), etc.

Of course, as mentioned above, when the hydrophilic aspartate resin of the present application contains cation-containing structures, both good hydrophilicity and improved flexibility can be provided, so it may not be necessary to introduce the second polyether segment as shown in formula (4) into the hydrophilic aspartate resin.

In some embodiments, a weight ratio of the first polyether segment in the hydrophilic aspartate resin is 3-35%. If the weight ratio of the first polyether segment in the hydrophilic aspartic resin is too low, it cannot impart good hydrophilicity to the resin; if the weight ratio of the first polyether segment in the hydrophilic aspartic resin is too high, the hydrophilicity of the aspartic resin becomes excessive, adversely affecting coating properties such as water resistance. For example, the weight ratio of the first polyether segment in the hydrophilic aspartic resin may be any value among 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 27%, 28%, 30%, 32%, 33%, 35% or any value within this range. Further, the weight ratio of the first polyether segment in the hydrophilic aspartic resin may be 3-30%.

The weight ratio of the cation-containing structure in the hydrophilic aspartic resin is 2-15%. For example, the weight ratio may be any value among 2%, 3%, 4%, 5%, 6%, 7%, 8%, 9%, 10%, 11%, 12%, 13%, 14%, 15% or any value within this range. Further, the weight ratio of the cation-containing structure in the hydrophilic aspartic resin may be 2-12%.

In some embodiments, both ends of the second polyether segment are directly chemically bonded to —NHCOO— groups and/or —OOC(N—)CONH— groups, i.e., both terminal hydroxyl groups of the second terminal hydroxyl polyether corresponding to the second polyether segment react with NCO groups and form —NHCOO— groups. The —NHCOO— groups may further react with NCO groups to form —OOC(N—)CONH— groups.

In some embodiments, a weight ratio of the second polyether segment in the hydrophilic aspartate resin is 5-45%, which can impart good flexibility to the hydrophilic aspartate resin. For example, the weight ratio of the second polyether segment in the hydrophilic aspartic resin may be any value among 5%, 6%, 8%, 10%, 12%, 15%, 18%, 20%, 25%, 30%, 35%, 40%, 45% or any value within this range. Generally, the higher the content of the second polyether segment, the better the flexibility of the hydrophilic aspartic resin. Further, the weight ratio of the second polyether segment in the hydrophilic aspartic resin may be 10-35%.

In some embodiments, the hydrophilic aspartic resin is obtained by reacting a raw material component A): a hydrophilic isocyanate prepolymer with a raw material component B): a second polyether diol, and then reacting with a raw material component C): a first amino resin;

the hydrophilic isocyanate prepolymer contains the first polyether segment;

the second polyether diol is the above-mentioned second terminal hydroxyl polyether, containing the second polyether segment;

or, the hydrophilic aspartate resin is obtained by reacting a raw material component D): a tertiary amine-containing isocyanate prepolymer with a raw material component E): a second amino resin followed by neutralization;

structures of the first amino resin and the second amino resin (which may be the above-mentioned amino resins containing the amino group, with the amino group being a secondary amino group) are independently as shown in formula (5):

(5)

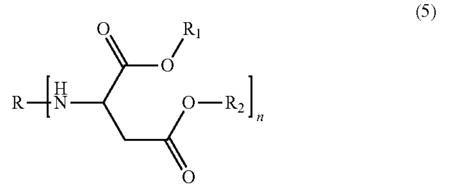

wherein R is an n-valent organic group with a number-average molecular weight of 50-5000 that is reaction-inert towards isocyanate at 100° C., $R_1$ and $R_2$ are independently selected from $C_1$-$C_8$ alkyl groups, and n is 2, 3, or 4.

The terminal groups of the hydrophilic isocyanate prepolymer contain a certain amount of NCO groups, which can react with the second polyether diol to introduce the second polyether segment and form —NHCOO— groups, or further react under excess NCO conditions (and with a catalyst) to form —OOC(N—)CONH— groups. The terminal groups of the intermediate product obtained after the reaction still contain a certain amount of NCO groups, which can further react with NH groups on amino resins (such as F420 resin, F520 resin from Feiyang Junyan Company) to form —N(X)CONH— groups, where X is the residue remaining after removing H from the secondary amino group of amino resins such as F420 resin and F520 resin, thereby obtaining hydrophilic aspartic resin. Hydrophilic isocyanate prepolymers can be obtained by the reaction of polyisocyanate monomers (such as diisocyanate monomers like IPDI, HMDI, TDI, HDI) with mono-terminated polyethylene glycol, forming —NHCOO— groups. When NCO is in excess (and in the presence of a catalyst), a further reaction occurs to form —OOC(N—)CONH— groups.

Alternatively, the flexible hydrophilic aspartate resin can be obtained by neutralizing a product of a reaction between a tertiary amine-containing isocyanate prepolymer and a second amino resin. For the preparation of the tertiary amine-containing isocyanate prepolymer, there is no particular limitation on the method; for example, it can be obtained by reacting a mono-hydroxyl tertiary amine compound (such as N,N-dimethyl ethanolamine, N,N-diethyl ethanolamine, N,N-dimethyl propanolamine, hydroxyethyl piperidine, hydroxyethyl morpholine, etc.) with a polyisocyanate monomer (such as a diisocyanate monomer including IPDI, HMDI, TDI, HDI, etc.) at a molar ratio of NCO groups to OH groups ranging from 1:2 to 1:10; when NCO is in excess (and under catalytic action), the —NHCOO— group can further react to form an —OOC(N—)CONH— group. There are no particular restrictions on the neutralizing agent, which may be an acidic neutralizing agent such as lactic acid, acetic acid, or a reagent capable of converting a tertiary amine into a quaternary ammonium salt, such as epichlorohydrin, dodecyl bromide, methyl iodide, etc.

In some embodiments, a weight ratio of NCO groups in the hydrophilic isocyanate prepolymer and the tertiary amine-containing isocyanate prepolymer is independently 5-40%, and for example, the weight ratio of NCO groups may be any value selected from 5%, 7%, 8%, 10%, 12%, 15%, 17%, 18%, 20%, 22%, 24%, 25%, 27%, 30%, 33%, 35%, 37%, 40% or any value therebetween. There is no particular limitation on the preparation method of the hydrophilic isocyanate prepolymer, which can be obtained by reacting a polyisocyanate monomer (such as IPDI, HDI, HDI trimer, IPDI trimer, HMDI) with a first terminal hydroxyl polyether (a mono-terminal hydroxyl polyether, such as MPEG). Further, the weight ratio of NCO groups in the hydrophilic isocyanate prepolymer may be 15-40%.

In some embodiments, a molar ratio of the second polyether diol to the first amino resin is 1:10-1:1; for example, the molar ratio may be any value selected from 1:10, 1:9, 1:8, 1:7, 1:6, 1:5, 1:4, 1:3, 1:2, 1:1, or any value therebetween.

A sum of mole numbers of active hydrogen (H on hydroxyl group) in the second polyether diol and active hydrogen (H on NH group) in the first amino resin to a mole number of NCO groups in the hydrophilic isocyanate prepolymer is in a molar ratio of 0.7-3:1; for example, the molar ratio may be any value selected from 0.7:1, 0.75:1, 0.8:1, 0.85:1, 0.9:1, 1:1, 1.2:1, 1.5:1, 1.8:1, 2:1, 2.2:1, 2.5:1, 2.7:1, 3:1, or any value therebetween. When the molar ratio of active hydrogen to NCO groups is below 1:1, such as 0.7:1, 0.75:1, 0.8:1, 0.85:1, etc., NCO groups are in excess, and the resulting flexible hydrophilic aspartic resin still contains a certain amount of NCO groups. After self-emulsification in water, the NCO groups continue to react with water to release $CO_2$ and generate primary amino groups, which further react with NCO groups, increasing the molecular weight of the flexible hydrophilic aspartic resin. Therefore, when the molar ratio of active hydrogen to NCO groups is below 1:1, the resulting emulsion can form a film without adding a curing agent. When the molar ratio of active hydrogen to NCO groups is above 1:1, such as 1.2:1, 2:1, 3:1, etc., the resulting flexible hydrophilic aspartic resin still contains a certain amount of NH groups, and the resulting emulsion can be cured by adding an isocyanate curing agent. When the molar ratio of the sum of the mole numbers of active hydrogen in the second polyether diol and the first amino resin to the mole number of NCO groups in the hydrophilic isocyanate prepolymer is close to 1:1, the resulting flexible hydrophilic aspartic resin has a larger molecular weight and fewer NCO or NH groups. A higher molecular weight of flexible hydrophilic aspartic resin imposes higher requirements on the self-emulsification process. Therefore, further considering production convenience and economy, the molar ratio of the sum of the mole numbers of active hydrogen in the second polyether diol and the first amino resin to the mole number of NCO groups in the hydrophilic isocyanate prepolymer may be 0.7-0.85:1 or 1.1-3:1.

A molar ratio of NCO groups in the tertiary amine-containing isocyanate prepolymer to NH groups in the second amino resin is 1:1-5, and for example, the molar ratio may be any value selected from 1:1, 1:1.5, 1:2, 1:2.5, 1:3, 1:3.5, 1:4, 1:4.5, 1:5, or any value therebetween.

On the other hand, the present application further provides an emulsion obtained by dispersing a raw material component including the flexible hydrophilic aspartic resin according to any one of the above embodiments in water.

The flexible hydrophilic aspartic resin of the present application has good hydrophilicity, can self-emulsify in water to form an emulsion, and a solid content of the emulsion can be 20-50 wt %. The emulsion may be formulated into an aqueous coating by adding leveling agents, wetting agents, defoamers, pigments, fillers, anti-settling agents, thixotropic agents, ultraviolet stabilizers, antioxidants, etc., and then cured together with an isocyanate curing agent to form a film.

The following further describes and illustrates the technical solutions of the present application through the examples.

Preparation Examples 1-6: Preparation of Hydrophilic Isocyanate Prepolymer

Preparation Example 1

1680 g of HDI (eq: 20 mol), 300 g of MPEG-300 (eq: 1 mol), and 1 g of tetramethylammonium hydroxide were mixed and heated to 90° C. for reaction until the NCO content reached 37.8 wt %, then the reaction was terminated by adding 1.3 g of 85% phosphoric acid aqueous solution, yielding a hydrophilic isocyanate prepolymer designated as isocyanate 1, with an equivalent weight of 111.1 g/mol and a content of a polyethylene glycol segment of 15.2 wt %.

Preparation Example 2

1680 g of HDI (eq: 20 mol), 1000 g of MPEG-1000 (eq: 1 mol), and 0.7 g of tetramethylammonium hydroxide were mixed and heated to 90° C. for reaction until the NCO content reached 29.4 wt %, then the reaction was terminated by adding 0.9 g of 85% phosphoric acid aqueous solution, yielding a hydrophilic isocyanate prepolymer designated as isocyanate 2, with an equivalent weight of 143 g/mol and a content of a polyethylene glycol segment of 37.3 wt %.

Preparation Example 3

1110 g of IPDI (eq: 10 mol), 300 g of MPEG-300 (eq: 1 mol), and 0.7 g of tetramethylammonium hydroxide were mixed and heated to 90° C. for reaction until the NCO content reached 23 wt %, then the reaction was terminated by adding 0.9 g of 85% phosphoric acid aqueous solution, yielding a hydrophilic isocyanate prepolymer designated as isocyanate 3, with an equivalent weight of 182.6 g/mol and a content of a polyethylene glycol segment of 21.3 wt %.

Preparation Example 4

555 g of IPDI (eq: 5 mol), 89.1 g of N,N-dimethylethanolamine (eq: 1 mol), and 0.7 g of tetramethylammonium hydroxide were mixed and heated to 90° C. for reaction until the NCO content reached 19.6 wt %, then the reaction was terminated by adding 0.9 g of 85% phosphoric acid aqueous solution, yielding a tertiary amine-containing isocyanate prepolymer, designated as isocyanate 4, with an equivalent weight of 214.3 g/mol and a content of a hydrophilic monomer N,N-dimethylethanolamine of 13.8%.

Preparation Example 5

420 g of HDI (eq: 5 mol), 266.4 g of hydroxyethyl morpholine (eq: 2 mol), and 0.8 g of tetramethylammonium hydroxide were mixed and heated to 90° C. for reaction until the NCO content reached 15.1 wt %, then the reaction was terminated by adding 0.9 g of 85% phosphoric acid aqueous solution, yielding a tertiary amine-containing isocyanate prepolymer, designated as isocyanate 5, with an equivalent weight of 278.1 g/mol and a content of a hydrophilic monomer hydroxyethyl morpholine of 38.8%.

Preparation Example 6

420 g of HDI (eq: 5 mol), 1000 g of MPEG-1000 (eq: 1 mol), and 0.7 g of tetramethylammonium hydroxide were mixed and heated to 90° C. for reaction until the NCO content reached 8.3 wt %, then the reaction was terminated by adding 0.9 g of 85% phosphoric acid aqueous solution, yielding a hydrophilic isocyanate prepolymer designated as isocyanate 6, with an equivalent weight of 506 g/mol and a content of a polyethylene glycol segment of 70.4 wt %.

Example 1

Isocyanate 1 (eq: 1 mol) from Preparation Example 1 and 45 g of PPG-300 (eq: 0.1 mol) were added into a reaction vessel, heated to 90° C. for reaction until the reaction was complete, then 263.2 g of F420 resin (eq: 0.95 mol) was added and reacted completely at 80° C., yielding a flexible hydrophilic aspartic resin. The flexible hydrophilic aspartic resin has a weight content of 4% polyethylene glycol segments and 10.7% polypropylene glycol segments.

An appropriate amount of water was added to the above flexible hydrophilic aspartic resin and emulsified at 30° C. to form an emulsion with a solid content of 50 wt %.

Comparative Example 1

Isocyanate 1 (eq: 1 mol) from Preparation Example 1 and 346.3 g of F420 resin (eq: 1.25 mol) were added into a reaction vessel, heated to 80° C. for reaction until the reaction was complete, yielding a flexible hydrophilic aspartic resin.

An appropriate amount of water was added to the above flexible hydrophilic aspartic resin and emulsified at 30° C. to form an emulsion with a solid content of 50 wt %.

Example 2

Isocyanate 2 (eq: 1 mol) from Preparation Example 2 and 300 g of PTMEG-2000 (eq: 0.3 mol) were added into a reaction vessel, heated to 90° C. for reaction until the reaction was complete, then 706.5 g of F420 resin (eq: 2.55 mol) was added and reacted completely at 80° C., yielding a flexible hydrophilic aspartic resin. The flexible hydrophilic aspartic resin has a weight content of 4.6% polyethylene glycol segments and 26.1% PTMEG segments.

An appropriate amount of water was added to the above flexible hydrophilic aspartic resin and emulsified at 30° C. to form an emulsion with a solid content of 50 wt %.

Example 3

Isocyanate 2 (eq: 1 mol) from Preparation Example 2 and 100 g of PTMEG-1000 (eq: 0.2 mol) were added into a reaction vessel, heated to 90° C. for reaction until the reaction was complete, then 166.2 g of F420 resin (eq: 0.6 mol) was added and reacted completely at 80° C., yielding a flexible hydrophilic aspartic resin. The flexible hydrophilic aspartic resin has a weight content of 13.0% polyethylene glycol segments and 24.4% PTMEG segments.

An appropriate amount of water was added to the above flexible hydrophilic aspartic resin and emulsified at 30° C. to form an emulsion with a solid content of 50 wt %.

Comparative Example 2

Isocyanate 2 (eq: 1 mol) from Preparation Example 2 and 221.6 g of F420 resin (eq: 0.8 mol) were added into a reaction vessel, heated to 80° C. for reaction until the reaction was complete, yielding a flexible hydrophilic aspartic resin.

An appropriate amount of water was added to the above flexible hydrophilic aspartic resin and emulsified at 30° C. to form an emulsion with a solid content of 50 wt %.

Example 4

Isocyanate 3 (eq: 1 mol) from Preparation Example 3 and 200 g of PPG-1000 (eq: 0.4 mol) were added into a reaction vessel, heated to 90° C. for reaction until the reaction was complete, then 221.6 g of F420 resin (eq: 0.8 mol) was added and reacted completely at 80° C., yielding a flexible hydrophilic aspartic resin. The flexible hydrophilic aspartic resin has a weight content of 6.4% polyethylene glycol segments and 33.1% PPG segments.

An appropriate amount of water was added to the above flexible hydrophilic aspartic resin and emulsified at 30° C. to form an emulsion with a solid content of 50 wt %.

Example 5

Isocyanate 3 (eq: 1 mol) from Preparation Example 3 and 100 g of PPG-1000 (eq: 0.2 mol) were added into a reaction vessel, heated to 90° C. for reaction until the reaction was complete, then 406 g of F520 resin (eq: 1.4 mol) was added and reacted completely at 90° C., yielding a flexible hydrophilic aspartic resin. The flexible hydrophilic aspartic resin has a weight content of 5.8% polyethylene glycol segments and 14.5% PPG segments.

An appropriate amount of water was added to the above flexible hydrophilic aspartic resin and emulsified at 30° C. to form an emulsion with a solid content of 40 wt %.

Example 6

Isocyanate 4 (eq: 1 mol) from Preparation Example 4 and F421 resin (eq: 2.5 mol) were added into a reaction vessel, heated to 90° C. for reaction until the reaction was complete, then lactic acid (eq: 0.33 mol) was added and reacted completely at 80° C., yielding a flexible hydrophilic aspartic resin. The flexible hydrophilic aspartic resin has a weight content of 3.2% N',N-dimethylethanolamine.

An appropriate amount of water was added to the above flexible hydrophilic aspartic resin and emulsified at 50° C. to form an emulsion with a solid content of 50 wt %.

Example 7

Isocyanate 5 (eq: 1 mol) from Preparation Example 5 and F420 resin (eq: 4 mol) were added into a reaction vessel, heated to 90° C. for reaction until the reaction was complete, cooled to 50° C., then acetic acid (eq: 0.5 mol) was added and reacted completely at 50° C., yielding a flexible hydrophilic aspartic resin. The flexible hydrophilic aspartic resin has a weight content of 7.6% hydroxyethyl morpholine.

An appropriate amount of water was added to the above flexible hydrophilic aspartic resin and emulsified at 50° C. to form an emulsion with a solid content of 50 wt %.

Example 8

Isocyanate 6 (eq: 1 mol) from Preparation Example 6 and 250 g of PTMEG-1000 (eq: 0.5 mol) were added into a reaction vessel, heated to 90° C. for reaction until the reaction was complete, then 166.2 g of F420 resin (eq: 0.6 mol) was added and reacted completely at 80° C., yielding a flexible hydrophilic aspartic resin. The flexible hydrophilic aspartic resin has a weight content of 38.6% polyethylene glycol segments and 27.1% polytetrahydrofuran ether segments.

An appropriate amount of water was added to the above flexible hydrophilic aspartic resin and emulsified at 30° C. to form an emulsion with a solid content of 50 wt %.

Comparative Example 3

Isocyanate 6 (eq: 1 mol) from Preparation Example 6 and 304.7 g of F420 resin (eq: 0.6 mol) were added into a reaction vessel, heated to 80° C. for reaction until the reaction was complete, yielding a flexible hydrophilic aspartic resin.

An appropriate amount of water was added to the above flexible hydrophilic aspartic resin and emulsified at 30° C. to form an emulsion with a solid content of 50 wt %.

Performance Test

Emulsion stability test: stored at 40° C. for 6 months.

Emulsion particle size test: carried out using a Malvern laser particle size analyzer.

Coating glossiness test: the emulsion to be tested (excluding Examples 3 and Comparative Examples 2) was mixed with a curing agent WL72-100 at an NH to NCO molar ratio of 1:1.1, and a resulting mixture was diluted with purified water to a solid content of 45%, then sprayed onto a clean tinplate, and cured at room temperature for 7 days, and then the coating glossiness was measured at a gloss of 60°. The emulsions of Example 3 and Comparative Example 2 were directly sprayed onto clean tinplates, cured at room temperature for 7 days, and then the coating glossiness was measured at a gloss of 60°.

Coating water resistance test: the emulsions to be tested (excluding Example 3 and Comparative Example 2) was mixed with a curing agent WL72-100 at an NH to NCO molar ratio of 1:1.1, and a resulting mixture was diluted with purified water to a solid content of 45%, then sprayed onto a clean tinplate, and cured at room temperature for 7 days. Half of each tinplate coated with the coating was then immersed in water, and after 48 hours, it was observed whether any abnormalities such as blistering, peeling, or edge lifting occur at the waterline. The emulsions of Example 3 and Comparative Example 2 were directly sprayed onto clean tinplates, cured at room temperature for 7 days, and then the water resistance of the coatings was tested.

Coating mechanical properties test: the emulsion to be tested (excluding Example 3 and Comparative Example 2) was mixed with a curing agent WL72-100 at an NH to NCO molar ratio of 1:1.1, and a resulting mixture was diluted with purified water to a solid content of 45%, and then coated to form a film with a thickness of 200 m, cured at room temperature for 7 days, and tested for tensile strength and elongation at break. The emulsions of Example 3 and Comparative Example 2 were directly sprayed onto clean tinplates, cured at room temperature for 7 days, and then the tensile strength and elongation at break of the coatings were tested.

The results are as shown in Table 1.

TABLE 1

| | Stability of emulsion | Particle size of emulsion/nm | Gloss/° | Water resistance | Tensile strength/MPa | Elongation at break/% |
|---|---|---|---|---|---|---|
| Example 1 | Stable | 24 | 92 | No abnormality | 35 | 112 |
| Example 2 | Stable | 15 | 95 | No abnormality | 27 | 269 |
| Example 3 | Stable | <1 | 90 | Whitish, no abnormality | 25 | 287 |
| Example 4 | Stable | 14 | 94 | No abnormality | 37 | 161 |
| Example 5 | Stable | 17 | 93 | No abnormality | 51 | 105 |
| Comparative Example 1 | Stable | 21 | 93 | No abnormality | 39 | 33 |
| Comparative Example 2 | Stable | <1 | 92 | Whitish, no abnormality | 28 | 74 |

TABLE 1-continued

| | Stability of emulsion | Particle size of emulsion/nm | Gloss/° | Water resistance | Tensile strength/MPa | Elongation at break/% |
|---|---|---|---|---|---|---|
| Example 6 | Stable | 35 | 91 | No abnormality | 41 | 138 |
| Example 7 | Stable | 8 | 95 | No abnormality | 45 | 121 |
| Example 8 | Stable | <1 | 90 | No abnormality | 32 | 201 |
| Comparative Example 3 | Stable | <1 | 92 | No abnormality | 35 | 59 |

Therefore, based on the data in Table 1 above, it can be known that introducing a second polyether segment with good flexibility into the structure of the hydrophilic aspartic resin in the present application can greatly increase the elongation at break of the film layer, while having little effect on the tensile strength, indicating that adding the second polyether segment can improve the flexibility of the film. Similarly, introducing a cation-containing structure into the structure of the hydrophilic aspartic resin can also yield a film with good tensile strength and elongation at break.

As described above, the basic principles, main features and advantages of the present application are illustrated and described. It should be understood by a person skilled in the art that the present application is not limited by the above examples, which are merely preferred examples of the present application. The scope of protection of the present application should not be defined solely thereby. All equivalent changes and modifications made in accordance with the scope of the present application and the content of the specification shall still fall within the scope encompassed by the present application. The scope of protection sought by the present application is defined by the appended claims and their equivalents.

What is claimed is:

1. A flexible hydrophilic aspartic resin, comprising a —N(X)CONH— group, a first polyether segment, a second polyether segment, and at least one of structures as shown in formula (1) or structures as shown in formula (2):

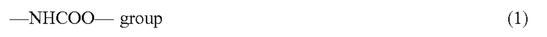
—NHCOO— group (1)

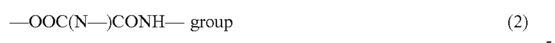
—OOC(N—)CONH— group (2)

wherein X is selected from H or a residue remaining after removing one hydrogen atom from an amino group of an amino resin containing the amino group, the amino group being a secondary amino group;

a molar content of a polyethylene glycol segment in the first polyether segment is not less than 80%, wherein the first polyether segment is directly chemically bonded to at least one of the —NHCOO— group or the —OOC(N—)CONH— group;

a molar content of a polyethylene glycol segment in the second polyether segment is not higher than 20%, wherein the second polyether segment is directly chemically bonded to at least one of the —NHCOO— group or the —OOC(N—)CONH— group;

a structure of the first polyether segment is as shown in formula (3):

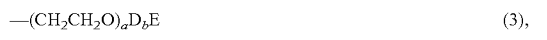
$—(CH_2CH_2O)_aD_bE$ (3), wherein D is at least one selected from a group consisting of: $—CH_2CH_2CH_2O—$, $—CH_2CH_3CHO—$, $—(CH_2)_4O—$, $—CH_2CH_2CH_3CHO—$, and $—(CH_2)_6O—$, $4 \leq a \leq 50$, $b \geq 0$, $a/(a+b) \geq 0.8$, and E is selected from $C_1$-$C_4$ alkyl group;

a structure of the second polyether segment is as shown in formula (4):

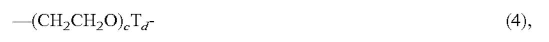
$—(CH_2CH_2O)_cT_d$- (4), wherein T is at least one selected from a group consisting of: $—CH_2CH_2CH_2O—$, $—CH_2CH_3CHO—$, $—(CH_2)_4O—$, $—CH_2CH_2CH_3CHO—$, $—(CH_2)_6O—$, and a divalent residue remaining after removing two active hydrogens from a polyester diol, $c \geq 0$, $4 \leq d \leq 50$, and $c/(c+d) \leq 0.2$;

or, the flexible hydrophilic aspartic resin comprises the —N(X)CONH— group, a cation-containing structure, and at least one of the structures as shown in the formula (1) or the structures as shown in the formula (2);

wherein a weight ratio of the cation-containing structure in the flexible hydrophilic aspartic resin is 2-15%.

2. The flexible hydrophilic aspartic resin according to claim 1, wherein a weight ratio of the first polyether segment in the flexible hydrophilic aspartic resin is 3-35%.

3. The flexible hydrophilic aspartic resin according to claim 1, wherein both ends of the second polyether segment are directly chemically bonded to the —NHCOO— group or the —OOC(N—)CONH— group.

4. The flexible hydrophilic aspartic resin according to claim 1, wherein a weight ratio of the second polyether segment in the flexible hydrophilic aspartic resin is 5-45%.

5. The flexible hydrophilic aspartic resin according to claim 1, wherein the flexible hydrophilic aspartic resin is obtained by reacting a hydrophilic isocyanate prepolymer with a second polyether diol, and then reacting with a first amino resin;

the hydrophilic isocyanate prepolymer contains the first polyether segment;

the second polyether diol contains the second polyether segment;

or, the flexible hydrophilic aspartic resin is obtained by reacting a tertiary amine-containing isocyanate prepolymer with a second amino resin followed by neutralization;

structures of the first amino resin and the second amino resin are independently as shown in formula (5):

(5)

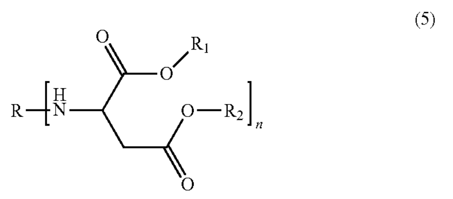

wherein R is an n-valent organic group with a number-average molecular weight of 50-5000 that is reaction-inert to isocyanate at 100° C., $R_1$ and $R_2$ are independently selected from $C_1$-$C_8$ alkyl groups, and n is 2, 3, or 4.

6. The flexible hydrophilic aspartic resin according to claim 5, wherein a weight ratio of NCO groups in the hydrophilic isocyanate prepolymer and the tertiary amine-containing isocyanate prepolymer is independently 5-40%.

7. The flexible hydrophilic aspartic resin according to claim 5, wherein a molar ratio of the second polyether diol to the first amino resin is 1:10-1:1;

a sum of mole numbers of active hydrogen in the second polyether diol and active hydrogen in the first amino resin to a mole number of NCO groups in the hydrophilic isocyanate prepolymer is in a ratio of 0.7-3:1; or a molar ratio of NCO groups in the tertiary amine-containing isocyanate prepolymer to NH groups in the second amino resin is 1:1-5.

8. An emulsion, wherein the emulsion is obtained by dispersing a raw material component comprising the flexible hydrophilic aspartic resin according to claim 1 in water.

* * * * *